United States Patent [19]
Dirne et al.

[11] Patent Number: 5,234,775
[45] Date of Patent: Aug. 10, 1993

[54] SOFT MAGNETIC MULTILAYER FILM AND MAGNETIC HEAD PROVIDED WITH SUCH A SOFT MAGNETIC MULTILAYER FILM

[75] Inventors: Franciscus W. A. Dirne; Hendrik J. De Wit; Cornelis H. M. Witmer; Johannes A. M. Tolboom; Peter Lasinski, all of Eindhoven, Netherlands

[73] Assignee: U.S. Philips Corporation, New York, N.Y.

[21] Appl. No.: 987,533

[22] Filed: Dec. 4, 1992

Related U.S. Application Data

[63] Continuation of Ser. No. 826,182, Jan. 22, 1992, abandoned, which is a continuation of Ser. No. 672,773, Mar. 20, 1991, abandoned, which is a continuation of Ser. No. 433,055, Nov. 7, 1989, abandoned.

[30] Foreign Application Priority Data

Nov. 11, 1988 [NL] Netherlands ........................ 8802873

[51] Int. Cl.$^5$ ............................ G11B 5/31; G11B 5/127
[52] U.S. Cl. .................................... 428/635; 428/682; 428/928
[58] Field of Search ............... 428/635, 636, 637, 638, 428/682, 683, 928, 611; 148/403

[56] References Cited

U.S. PATENT DOCUMENTS

| | | | |
|---|---|---|---|
| 4,236,946 | 12/1980 | Aboat et al. | 148/403 |
| 4,364,020 | 12/1982 | Lin et al. | 336/212 |
| 4,437,912 | 3/1984 | Sakakima et al. | 148/403 |
| 4,506,248 | 3/1985 | Lin | 336/233 |
| 4,565,746 | 1/1986 | Hayase | 428/928 |
| 4,610,935 | 9/1986 | Kumasaka et al. | 428/632 |
| 4,748,089 | 5/1988 | Kumasaka et al. | 428/635 |
| 4,891,278 | 1/1990 | Otomo et al. | 428/928 |
| 4,897,318 | 1/1990 | Sakakima et al. | 428/635 |
| 4,935,314 | 6/1990 | Kobayashi et al. | 428/635 |

FOREIGN PATENT DOCUMENTS

| | | | |
|---|---|---|---|
| 0261664 | 3/1988 | European Pat. Off. | |
| 56-41349 | 4/1981 | Japan | 428/928 |
| 60-154602 | 8/1985 | Japan | 428/928 |
| 61-153813 | 7/1986 | Japan | 428/928 |

*Primary Examiner*—John Zimmerman
*Attorney, Agent, or Firm*—Norman N. Spain

[57] ABSTRACT

The invention relates to a soft magnetic multilayer film which comprises a number of crystalline main layers and a number of amorphous secondary layers, the main layer substantially exclusively comprising iron as the magnetic constituent, and the secondary layer comprising mainly iron as the magnetic constituent. Such multilayer films exhibit a relatively low magnetostriction constant which is almost not influenced by temperature treatments. Such films are very suitable for use in magnetic heads.

5 Claims, 1 Drawing Sheet

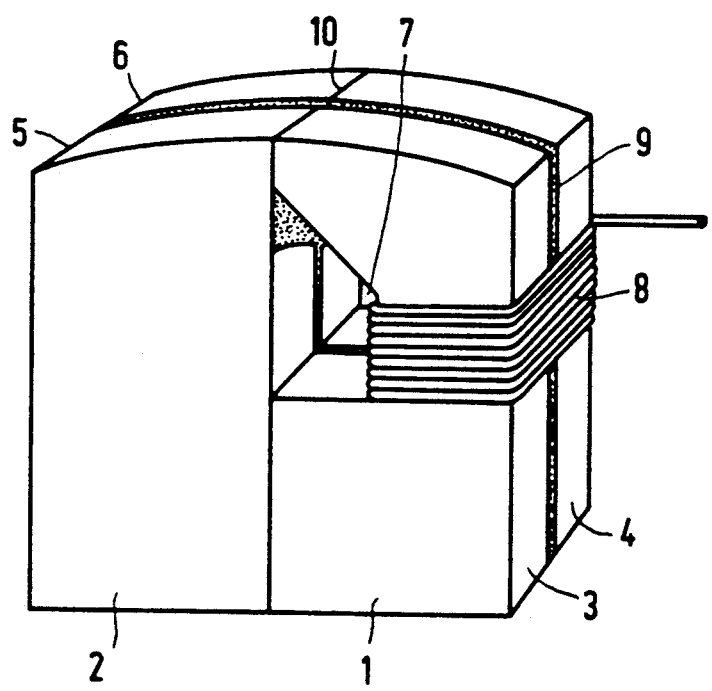

SOFT MAGNETIC MULTILAYER FILM AND MAGNETIC HEAD PROVIDED WITH SUCH A SOFT MAGNETIC MULTILAYER FILM

This application is a continuation of Ser. No. 826,182, filed Jan. 22, 1992, now abandoned, which is a continuation of Ser. No. 672,773, filed Mar. 20, 1991, now abandoned, which is a continuation of Ser. No. 433,055, filed Nov. 7, 1989, now abandoned.

BACKGROUND OF THE INVENTION

The invention relates to a soft magnetic multilayer film comprising a number of crystalline main layers and a number of amorphous secondary layers, the layers being alternately provided and the magnetic constituent of the main layers being substantially exclusively Fe. The invention also relates to a magnetic head which is provided with such a soft magnetic multilayer film.

A soft magnetic multilayer film of this type is known from Abstract No. F1-04 on page 366 of the Book of Abstracts of the ICMFS-12 conference, which was celebrated in Le Creusot in 1988. This literature reference more particularly describes a multilayer film having main layers of crystalline Fe and secondary layers of amorphous CoNbZr. These layers are alternately provided by means of sputtering. The amorphous secondary layers serve to limit the grain size of the crystallites of the main layer. The well-known multilayer film exhibits a number of suitable soft magnetic properties such as a high saturation magnetisation ($B_s$), a small coercive force ($H_c$) and a high magnetic permeability ($\mu$). For example, the well-known multilayer film, which has an overall thickness of 0.5 $\mu$m and which consists of alternately applied layers of 10 nm thick crystalline Fe and 5 nm thick amorphous $Co_{86.2}Nb_{9.6}Zr_{4.2}$, has a saturation magnetisation of 1.8 T, a coercive force of 60 A/m and a permeability of at least 2000 in the frequency range up to 20 MHz.

Applicants have found that the well-known soft magnetic multilayer film has the disadvantage that it has a large magnetostriction constant ($\lambda_s$). The absolute value of this constant even considerably exceeds the individual values of crystalline Fe and amorphous CoNbZr. It was found, for example, that a multilayer film composed of 40 layers of 5 nm thick amorphous $Co_{86.2}Nb_{9.6}Zr_{4.2}$ and 40 layers of 10 nm thick crystalline Fe, both types of layers being alternately applied, has a magnetostriction constant of $+10\times10^{-6}$. The magnetostriction constants of crystalline Fe and amorphous CoNbZr are $-5\times10^{-6}$ and $+0.2\times10^{-6}$, respectively. On the basis of the two last-mentioned values and the thicknesses of the individual layers a multilayer magnetostriction constant of $-2.4\times10^{-6}$ may be expected. Consequently, the actual magnetostriction considerably exceeds the expected value. If the known multilayer film is used in a magnetic head the high value of the magnetostriction constant forms a serious problem because an increase of the magnetostriction constant brings about a decrease of the signal/noise ratio (SNR-ratio). Consequently, the aim in the manufacture of multilayer film for use in magnetic heads is to minimize the absolute value of the magnetostriction constant of the film, preferably below $5\times10^{-6}$.

The well-known multilayer film has the additional disadvantage that the value of the magnetostriction constant was found to have increased considerably after a heat treatment. For example, after exposing the film to a firing treatment of 300° C. for one hour it was found that the magnetostriction constant of the multilayer film mentioned in the preceding paragraph had more than tripled to a value of $+30\times10^{-6}$. This is problematic, in particular, when soft magnetic multilayer films are used in magnetic heads, because at present such a film is customarily subjected to heat treatments in the magnetic head.

SUMMARY OF THE INVENTION

It is an object of the invention to provide a soft magnetic multilayer film which does not have the above disadvantages. To this end, it is an object of the invention to provide a soft magnetic multilayer film having a magnetostriction constant with an absolute value below $5\times10^{-6}$ and, preferably, equal to or substantially equal to zero. According to yet another object the invention provides a soft magnetic multilayer film having a magnetostriction constant which is substantially independent of heat treatments. A further object of the invention it to provide a soft magnetic multilayer film having a high saturation magnetisation ($B_s$) which preferably exceeds 1.4 T. Another object of the invention is to provide a soft magnetic multilayer film having a small coercive force ($H_c$) which is preferably smaller than 100 A/m. According to yet another object the invention provides a soft magnetic multilayer having a high magnetic permeability ($\mu$) which exceeds 1000 in the frequency range above 10 MHz.

These and other objects are attained by means of a soft magnetic multilayer film of the type mentioned in the opening paragraph, which is characterized according to the invention in that the magnetic constituent of the secondary layers is composed of at least 90 at. % Fe. When such secondary layers are used in a multilayer film of the type mentioned in the opening paragraph the absolute value of the magnetostriction constant is found to be surprisingly low. Further it has been found that heat treatments have no or substantially no influence on this low value.

The above-stated measure according to the invention is based on the insight gained by Applicants that diffusion layers are formed at the interfaces of main and secondary layers, amongst others, by the mixing of ions during the sputtering operation. These diffusion layers have a large influence on the magnetostriction value of the multilayer film. For example, in the well-known multilayer film diffusion layers will be formed having substantial quantities of both Fe and Co as the magnetic constituents. Such a diffusion layer which comprises several magnetic elements will generally have a high positive magnetostriction constant which is proportional to the concentration of the ion pairs of the various magnetic elements and which reaches it maximum value when these elements are in a ratio of one to one ($70\times10^{-6}$ for Fe/Co and $25\times10^{-6}$ for Fe/Ni.) The fact that the magnetostriction of the well-known multilayer film has increased after a firing treatment seems to be in accordance with the said insight. It is to be expected that the thickness of the said diffusion layer has increased after such a heat treatment and, hence, also the magnetostriction of the well known multilayer film. Based on this knowledge, the multilayer film according to the present invention comprises exclusively or substantially exclusively Fe as the magnetic element in the secondary layer. In this manner, it is attained that the diffusion layer comprises substantially or exclusively Fe as the magnetic element and hardly any other or no other magnetic elements such as Ni and/or Co. Such a diffusion layer has a small magnetostriction constant, so that the multilayer film also has a small magnetostriction constant. The Curie temperature of the secondary layer can be increased by adding a small quantity of Co and/or Ni (up to 10 at. % of the overall quantity of magnetic elements), which may sometimes advantageously influence the properties of the overall multilayer film. This addition also makes it possible to render this amorphous layer slightly anisotropic. Such a small quantity of Co and/or Ni has a very small influence on the value of the magnetostriction constant.

A preferred embodiment of the multilayer according to the invention is characterized in that the secondary layer comprises exclusively Fe as the magnetic constituent. Such multilayer films exhibit the lowest magnetostriction values and the highest saturation magnetisation values.

Another preferred embodiment of the multilayer film according to the invention is characterized in that the secondary layer also comprises at least one of the metalloids selected from the group consisting of Si, P, B and C, the overall metalloid content of the secondary layer being minimally 15 and maximally 30 at. %. The said metalloids enhance the amorphous structure of the Fe-rich secondary layer. If the metalloid content of the secondary layer exceeds 30 at. % the overall saturation magnetisation of this layer decreases considerably. This adversely affects the saturation magnetisation of the multilayer film. If the metalloid content is smaller than 15 at. % it is difficult to render the secondary layer amorphous.

Yet another preferred embodiment of the multilayer film according to the invention is characterized in that the secondary layer also comprises at least one of the transition elements selected from the group consisting of Ru, Rh, Pr, Pd, Cu, Ag, Au, Nb, Ti, Cr, Mo, V, W and Ta. By adding one or more of these elements the magnetostriction value of the secondary layer can be influenced to a limited extent, so that the total magnetostriction of the multilayer film can be rendered zero or substantially zero. Further, the addition of one or more of these elements may have an advantageous effect on the mechanical properties of the multilayer film (wear, corrosion resistance). To keep the saturation magnetisation of the multilayer film at a sufficiently high level, preferably, maximally 10 at. % of these transition elements are added.

A further preferred embodiment of the multilayer film according to the invention is characterized in that the thickness of the main layer ranges between 5 nm and 40 nm. When the thickness of the main layer is equal to or larger than 40 nm the crystallites can attain a maximum dimension which exceeds the thickness of the Bloch-wall of the material of which the main layer is composed. Due to this the influence of the magnetic anisotropy (K) of the main layer is substantial and brings about a low magnetic permeability $\mu$. This is very undesirable when the soft magnetic material is used in a magnetic head. When the main layer has a thickness smaller than or equal to 4 nm the saturation magnetisation of the multilayer film decreases substantially even when the thickness of the secondary layer is minimal. The main layers of the multilayer film are to comprise substantially exclusively Fe as the magnetic constituent. This is to be understood to mean that the main layers comprise at least 95 at. %, preferably at least 98 at. %, of Fe as the magnetic constituent. The presence of a small quantity of Co and/or Ni in the main layers slightly increases the magnetostriction and the saturation magnetisation. Better results are obtained when the main layers comprise exclusively Fe as the magnetic element. The best results, however, are obtained using main layers which comprises exclusively Fe.

A still further preferred embodiment of the multilayer film according to the invention is characterized in that the thickness of the secondary layer is minimally 2 and maximally 6 nm. It has been found that if the thickness of the secondary layer is selected smaller than approximately 2 nm the crystallites of the main layer grow through the secondary layer. Due to this, crystallites are formed in the multilayer film, the largest dimension of which exceeds the thickness of the Bloch-wall of the crystalline material. As has been stated in the preceding paragraph, this brings about a considerable decrease of the magnetic permeability of the multilayer film. If the thickness of the amorphous secondary layer is selected larger than 6 nm a soft magnetic multilayer film is obtained having a relatively low saturation magnetisation.

The magnetic multilayers according to the invention can be used, inter alia, in transformers. However, the multilayer film is preferably used in magnetic heads.

The invention also relates to such a magnetic head which is provided with a multilayer film according to the present invention. This type of magnetic heads scan be optimally used in magnetic recording means such as magnetic tapes and magnetic discs, in which it is important to attain a high information density, as is the case with, for example, video equipment.

BRIEF DESCRIPTION OF THE DRAWING

The invention will be explained in greater detail by means of exemplary embodiments and with reference to the accompanying drawing, in which the FIGURE shows a magnetic head which is provided with the soft magnetic multilayer film according to the invention.

EXAMPLE

DETAILED DESCRIPTION OF THE PREFERRED EMBODIMENTS

A soft magnetic multilayer film was manufactured on a substrate of glass. The substrate was secured to a rotatable substrate holder of an ion beam deposition device, which holder was introduced into a vacuum chamber. The vacuum chamber was evacuated, so that $p < 5 \times 10^{-7}$ Torr. During the application of the multilayer an Ar gas flow was led through the vacuum chamber, the Ar pressure being maintained at $p < 1.5 \times 10^{-4}$ Torr. A Fe target was used for the main layers and a target of a Fe-rich alloy having the desired composition was used for the secondary layer. Via computer-controlled rotation of the target holder both sputter targets could be alternately positioned in the ion beam (1.5 kV, 80 mA).

Tables 1 and 2 list a number of multilayer films having an overall thickness (substrate excluded) of approximately 0.5 $\mu$m, which films are manufactured as described above. Table 1 lists the composition and the thickness d (nm) of the main layers (H) and the secondary layers (N), and table 2 lists a number of important magnetic values of the multilayer film composed of these main and secondary layers, such as the value of the saturation magnetisation $B_s$ (T), the coercive force $H_c$ (A/m), the magnetic permeability $\mu m$ (measured at 2 MHz) and the magnetostriction constant. The value of the magnetostriction constant was measured before ($\lambda_s$) and/or after ($\lambda'_s$) a firing treatment at 350° C. for one hour.

TABLE 1

| No. | H | d(nm) | N | d(nm) |
|---|---|---|---|---|
| 1 | Fe | 10 | $Fe_{74}Cr_6B_{20}$ | 5 |
| 2 | " | 10 | " | 4 |
| 3 | " | 10 | " | 3 |
| 4 | " | 10 | " | 2 |
| 5 | " | 15 | " | 5 |
| 6 | " | 10 | $Fe_{77}Ti_8B_{15}$ | 5 |
| 7 | " | 10 | " | 3 |
| 8 | " | 10 | " | 2 |
| 9 | " | 15 | " | 5 |
| 10 | " | 20 | " | 5 |
| 11 | " | 10 | $Fe_{73.3}Cr_{6.7}B_{20}$ | 3 |
| 12 | " | 10 | $Fe_{74}Cr_6B_{20}$ | 1 |
| 13 | " | 10 | $Fe_{77}Ti_8B_{15}$ | 1 |
| 14 | " | 2 | $Fe_{73.7}Cr_{6.7}B_{20}$ | 5 |
| 15 | " | 40 | " | 5 |
| 16 | " | 80 | " | 5 |
| 17 | " | 160 | " | 5 |
| 18 | " | 10 | $Fe_{69}Au_{14}B_{17}$ | 2 |
| 19 | " | 15 | " | 5 |
| 20 | " | 15 | " | 3 |
| 21 | " | 15 | " | 2 |
| 22 | " | 20 | " | 4 |

TABLE 2

| No. | $B_s$ (T) | $H_c$ (A/m) | $\mu$ (2 MHz) | $\lambda_s$ ($10^{-6}$) | $\lambda'_s$ ($10^{-6}$) |
|---|---|---|---|---|---|
| 1 | 1.8 | 40 | 3000 | +3.9 | +1.3 |
| 2 | 1.8 | 48 | 2800 | +3.4 | +0.4 |
| 3 | 1.9 | 64 | 2000 | +1.9 | +0.15 |
| 4 | 1.9 | 92 | 1300 | +2.6 | +0.08 |
| 5 | 1.8 | 90 | 1900 | +1.9 | −0.1 |
| 6 | 1.5 | 40 | 3600 | +0.3 | −1.6 |
| 7 | 1.6 | 50 | 4400 | −0.2 | −2.2 |
| 8 | 1.8 | 40 | 4800 | −0.6 | −5.0 |
| 9 | 1.9 | 50 | 3600 | −1.5 | — |
| 10 | 1.9 | 70 | 2300 | −4.2 | — |
| 11 | 1.9 | 21 | 2300 | — | +4.9 |
| 12 | — | 1000 | 200 | +4.3 | −0.4 |
| 13 | 1.9 | 350 | 400 | +0.9 | −1.5 |
| 14 | 1.3 | 43 | 1500 | — | — |
| 15 | 1.8 | 350 | 100 | 0.0 | — |
| 16 | 1.8 | 600 | 80 | −1.2 | — |
| 17 | 1.8 | 800 | 80 | −1.8 | — |
| 18 | 1.9 | 37 | 1000 | — | +3.3 |
| 19 | 1.6 | 94 | 450 | — | +4.7 |
| 20 | 1.7 | 97 | 520 | — | +3.0 |
| 21 | 1.9 | 83 | 700 | — | +1.8 |
| 22 | 1.9 | — | 400 | — | −1.0 |

From the tables it can be derived that the soft magnetic multilayer films have a low to very low magnetostriction value which is often below $5 \times 10^{-6}$. The table further shows that in a number of cases firing brings about only a small change in the magnetostriction value. The table further indicates that the use of an intermediate layer having a thickness of less than 2 nm leads to a multilayer film having a relatively large coercive force and a low permeability (examples 12 and 13). If the main layer is thinner than 4 nm the saturation magnetisation decreases (Example 14). If the main layer is thinner than or equal to 40 nm the permeability decreases considerably (Example 15, 16 and 17).

The FIGURE shows a magnetic head which is provided with a soft magnetic multilayer film according to the invention. The magnetic head is composed of two core portions 1 and 2 which comprise two substrate portions, 3 and 4, 5 and 6, respectively. The core portion 1 comprises a winding aperture 7 through which a coil 8 is wound. An electric write, read or erase signal may be passed through this coil. A layer of the soft magnetic multilayer film 9 (typical thickness: 10 $\mu m$) is present between the substrate portions of the core portions. A gap 10 having a typical gap length of approximately 0.25 $\mu m$ is formed between both core portions 1 and 2.

In the manufacture of the above magnetic head, each of the core portions is composed of two substrate portions, in a customary manner, by means of thermocompression. For this purpose, a substrate portion which may consist of a ceramic material such as, for example, glass or ferrite, is provided with a multilayer film. This substrate portion and a substrate portion to which no film is applied, are provided on the sides to be interconnected with two thin layers of Mo and Au, respectively (overall thickness for example 0.05 $\mu m$). By means of thermocompression (typical temperatures: 250°–350° C.) a (Au) diffusion bond is formed between both substrate portions. In this manner it is also possible to interconnect two substrates which are provided with a multilayer film, so as to form a core portion. In this case the Au/Mo layers are located between two multilayer films.

Interconnecting two core portions to form a magnetic head may also be obtained by means of thermocompression. In this case a gap is obtained the desired gaplength of which depends on the thickness of the Mo/Au layer provided on the core portions. The interconnection of substrate portions and core portions may however also be carried out differently, for example by means of bonding using an adhesive. However, it has been found in practice that it is difficult to control the gaplength of a magnetic head whose core portions are bonded using an adhesive.

We claim:

1. A magnetic head comprising a sputtered magnetic multilayer film having a magnetostriction constant ($\lambda s$) of an absolute value below $5 \times 10^{-6}$, said multilayer film consisting of main crystalline layers, each main layer being of a thickness of 5 nm–40 nm and consisting of crystalline Fe alternating with amorphous secondary layers, each secondary layer being of a thickness of 2 nm–6 nm and having a magnetic constituent consisting at least 90 at % of amorphous iron.

2. A magnetic head as claimed in claim 1, characterized in that the secondary layers additionally comprise at least one of the metalloids selected from the group consisting of Si, P, B and C, the overall metalloid content of each of the secondary layers being minimally 15 and maximally 30 at. %.

3. A magnetic head as claimed in claim 2 wherein the secondary layers additionally comprise at least one transition element selected from the group consisting of Ru, Rh, Pr, Pd, Cu, Ag, Au, Nb, Ti, Cr, Mo, V, W and Ta.

4. A magnetic head as claimed in claim 1, characterized in that the secondary layers additionally comprise at least one of the transition elements selected from the group consisting of Ru, Rh, Pr, Pd, Cu, Ag, Au, Nb, Ti, Cr, Mo, X, W, and Ta.

5. A magnetic head as claimed in claim 1 wherein the only magnetic constituent in the secondary layers is Fe.

* * * * *